May 4, 1971

A. I. LIPSKI 3,577,504

METHOD OF MANUFACTURING A GIRDER WITH
A WEB OF REINFORCED AND/OR
PRESTRESSED CONCRETE

Filed Feb. 28, 1969

ABRAHAM ICCHOK LIPSKI, Inventor

By, Wenderoth Lind & Ponack

Attorneys

ABRAHAM ICCHOK LIPSKI, Inventor

Attorneys

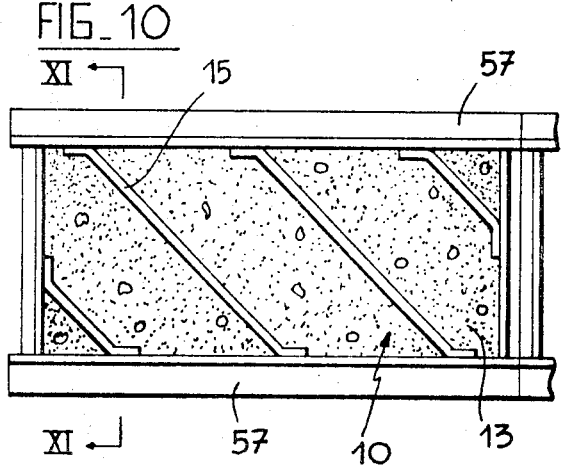
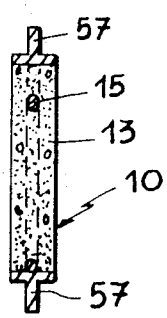
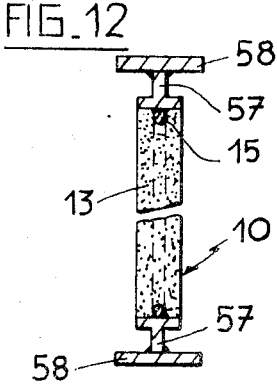
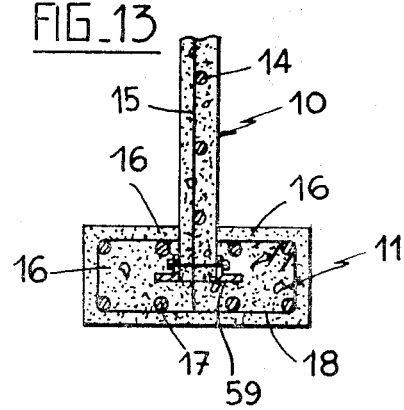
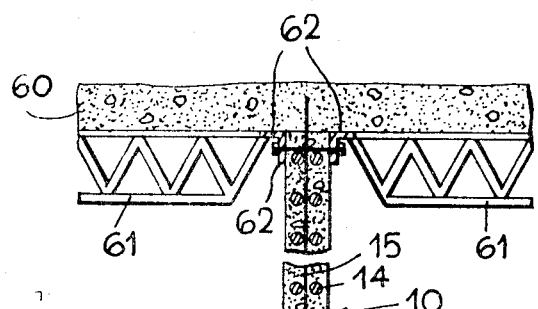

United States Patent Office 3,577,504
Patented May 4, 1971

3,577,504
METHOD OF MANUFACTURING A GIRDER WITH A WEB OF REINFORCED AND/OR PRESTRESSED CONCRETE

Abraham Icchok Lipski, 85 Avenue de Boetendael, Brussels, Belgium
Continuation-in-part of application Ser. No. 533,697, Mar. 11, 1966. This application Feb. 28, 1969, Ser. No. 803,217
Claims priority, application Belgium, Mar. 26, 1965, 661,699; Dec. 8, 1965, 673,451
Int. Cl. B28b 1/02; F04b 1/02, 1/08
U.S. Cl. 264—255                                        5 Claims

ABSTRACT OF THE DISCLOSURE

A method for manufacturing a girder with a thin web in reinforced or prestressed concrete, the web thickness being 2 cm. plus 6% of the width up to 50 cm. width and 5 cm. plus 2.5% of the width thereafter. Said thin web is prefabricated independently of at least one flange in a horizontal flat mould. Said flanges are thereafter integrated with said thin web.

---

This application is a continuation-in-part of my application Ser. No. 533,697 filed Mar. 11, 1966, entitled "Method for Manufacturing a Girder With a Web of Reinforced and/or Prestressed Concrete."

The present invention relates to a method for manufacturing a girder having a web of reinforced or prestressed concrete and at least one flange integral with the web.

In practice and according to the inventive concept, the web is made so that its maximum thickness is equal to the sum of 2 cm. and 6% of the height up to a height of 50 cm. and to the sum of 5 cm. and 2.5% of its height above a height of 50 cm. On the other hand, its shear reinforcement is designed to carry the fully tensile stress due to the shearing forces. In these circumstances, the average volume ratio of the concrete to the shear reinforcement is equal to or less than 35 for a reinforced concrete web and 125 for a pre-stressed concrete web, said average volume ratio being computed in areas of maximum shearing forces, the length of said areas being at the most equal to the height of the web. The same average volume ratios exist in the areas subjected to high tensile stresses due to bending moments in usual girders and they are quite different in areas subjected to high tensile stresses due to shear forces in webs of said usual girders, that will be shown later on.

Unfortunately, serious difficulties are encountered in producing very thin web girders of reinforced concrete according to the known methods, in particular as far as casting forms and emplacement of concrete into these casting forms are concerned. These difficulties make it impossible to make webs of thickness below certain practical limits, these same considerations make it very difficult to produce open webs.

The present invention has for its object the provision of a new method for effectively making girders having such a particularly thinned web, and the provision of the resulting girder itself.

According to this new method, the thin web is prefabricated independently of at least one flange and the latter is then made integral with the prefabricated and hardened thin web. The prefabrication of the thin web takes place in a horizontal flat mould having a height that corresponds to the thickness of the web and being equal to the sum of 2 cm. and 6% of its width up to a width of 50 cm. and to the sum of 5 cm. and 2.5% of its width above a width of 50 cm., said width corresponding on the other hand to the height of this web. Furthermore, in this mould, the reinforcement taking over the shearing force is disposed in such a way that the average ratio of the volume of the concrete of the web to the volume of said reinforcement is equal to or less than 35 for a reinforced concrete web and 125 for a prestressed concrete web, said average ratio being computed in areas of maximum shearing forces, the length of said areas being at the most equal to the height of the web.

In practice, the horizontal flat mould is formed by a horizontal working table upon which side forms are placed.

Casting of concrete of the thin web should be done in a flat position in the above-mentioned horizontal mould and cannot be done in a vertical mould. Indeed, since the walls of such a mould would be close to one another and since the transverse and longitudinal reinforcement bars of the web would be disposed between these walls, there would be no sufficient free space between the latter and the reinforcement bars to allow passage of concrete downwardly. Such concrete that would be poured on the upper part of such a vertical mould would not flow in the latter in a uniform way up to the bottom thereof. Only the slag and the fine elements forming said concrete would flow to the lower part of the mould while the aggregates and the gravel of the same concrete would be stopped by the reinforcement bars and would remain in the upper part of the same mould.

For particularly long girders, the web is made of a plurality of successive lengths fixed to one another. For this purpose, said lengths of thin web are made separately as if the properly so-called webs were made but the transverse and longitudinal reinforcement bars of each web length are allowed to project laterally so as to obtain splicing bars for continuity. In this way, thanks to these splicing bars two adjoining web lengths may be connected to one another by being placed longitudinally end to end and by pouring between them in a suitable little mould, a reinforced concrete part so as to obtain continuity of the web. On the other hand, since successive web lengths are made to form the whole web, the thickness of each of these web lengths is dimensioned according to the shearing force to which it will be subjected and that may vary along the girder, the calculation of this thickness being made as for the web of the described girder.

Thanks to the horizontal casting of the thin web, it is easy to manufacture an open web. Indeed, blocks or internal forms should be placed on the flat horizontal working table between the reinforcement bars, said blocks or internal forms having the same height as the external sides of the mould. Thereafter concrete should be poured into said mould between said blocks or internal forms.

Ther are several ways of making the flange integral with the thin prefabricated and hardened web.

One of these ways consists in fixing the shear reinforcement bars of the web to at least one metal border, that serves as a lost side wall of the casting mould for said web and is thereafter incorporated with a reinforced or pre-stressed concrete flange or fixed to a metal flange.

If necessary, two structural elements may also be mounted onto a longitudinal edge of the prefabricated thin web and on both sides of said edge, in order to make a flange. When these structural elements are temporarily and movably mounted on the web, they mainly serve as a support of the flange formwork and may be removed and reused after hardening of the latter. When said structural elements are permanently fixed to the web, they are incorporated with the flange.

Other details and particular features of the invention will be described with reference to the accompanying drawings that show schematically and only in an exemplary way, several embodiments of girders having thin web according to the invention.

FIG. 10 is an elevation showing a particular embodiment of the thin web of the girder according to the invention, having longitudinal metal borders.

FIG. 11 is a cross-section of the latter thin web, made on the line XI—XI of FIG. 10.

FIG. 12 is a cross-section of a girder having the same thin web and metal flanges integral therewith.

FIG. 13 is a cross-section of a part of another embodiment of the connection between the thin web and a reinforced concrete flange of a girder according to this invention.

Figure 1:
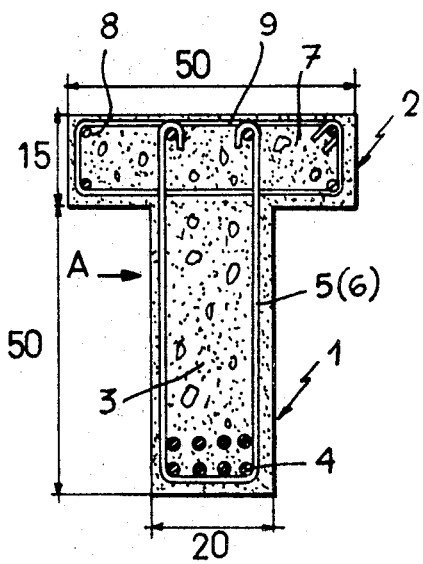
FIG. 1 is a cross-section of a ocnventional girder A having a thick reinforced concrete web.

FIG. 14 also is a cross-section of a different embodiment of the connection between the thin web and the reinforced concrete flanges of a girder according to this invention.

In these various figures the same reference numerals refer to similar elements.

FIG. 1 shows a conventional girder A in the form of a straight T and comprising a web 1 and a flange 2, both in reinforced concrete.

The web 1 of the girder A comprises a concrete body 3 surrounding longitudinal reinforcement bars 4 and transverse reinforcement bars 5 and 6. The concrete 3 has for example, a compressive strength $R'_{br}=450$ kg./cm.$^2$. The longitudinal reinforcement bars 4 consist of eight rods of mild steel A37 having a diameter of $\phi=22$ mm. On the other hand, the transverse reinforcement is formed of stirrups 5 and of bent up bars 6. The stirrups 5 are made of mild steel bars having a diameter $\phi=8$ mm. They are disposed perpendicularly to the flange 2 and uniformly distributed along the length of the web 1, at a spacing of five per meter. The bars 6 are of mild steel having a diameter of $\phi=22$ mm. They are bent up under an angle of 45° with respect to the flange 2 and are distributed uniformly along the length of the web 1, at a spacing of three bars per meter. The transverse reinforcement bars 5 and 6 act for the mutual anchoring of the web 1 and of the flange 2.

The web 1 of the girder A has a width of 20 cm. and a height of 50 cm. Said web 1 is accordingly of the "thick" type.

The flange 2 of the girder A also comprises a concrete body 7, longitudinal reinforcement bars 8 and transverse reinforcement bars 9 embedded in the later. The longitudinal reinforcement bars 8 respectively consist in six mild steel bars having a diameter of $\phi=8$ mm. The transverse reinforcement bars 9 are made of mild steel bars having a diameter of $\phi=8$ mm.

The flange 2 of the girder A has a width of 50 cm. and a height of 15 cm.

Figure 2:
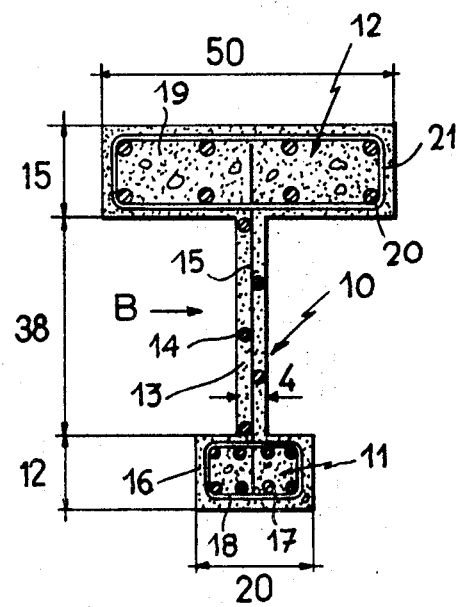
FIG. 2 is a cross-section of a girder B with a thin reinforced concrete web, having the same effective span and resisting the applied loads as the preceding girder A.

FIG. 2 shows a new girder B according to this invention and having the same effective span and resisting the same applied loads as girder A.

The girder B comprises a web 10, a lower flange 11 and an upper flange 12, all three being of reinforced concrete.

The web 10 of the girder B consists in a concrete body 13 reinforced by means of longitudinal reinforcement bars 14 and transverse reinforcement bars 15. In the selected example, the longitudinal reinforcement bars 14 comprise five mild steel rods having a diameter of $\phi=8$ mm. whereas the transverse reinforcement bars 15 are formed of mild steel bars having a diameter of $\phi=8$ mm. The reinforcement bars 15 are inclined at an angle of 45° with respect to the flanges 11 and 12 and are uniformly distributed along the length of the web 10, at the spacing of one bar per 3.1 cm.

The web 10 of the girder B has a width of 4.0 cm. and a height of 38 cm. This web 10 is accordingly of the "thin" type. Its width is less than the sum of 2 cm.+6% of its height. Indeed, $2+0.06\times38=4.28$ cm.

On the other hand, the ratio of the volume of the concrete 13 to the volume of reinforcement bars 15 adapted to take over the shearing force is equal to 17.5 as indicated later on and is in any case less than 35.

The lower flange 11 of the girder B comprises a concrete body 16, longitudinal reinforcement bars 17 and transverse reinforcement bars 18.

Actually, the longitudinal reinforcement bars 17 consist of eight mild steel bars having a diameter of $\phi=22$ mm. whereas the transverse reinforcement 18 is formed of mild steel bars having a diameter of $\phi=8$ mm. and a spacing of 20 cm.

The lower flange 11 of the girder B has a width of 20 cm. and a height of 12 cm.

The upper flange 12 of the girder B also comprises a concrete body 19 surrounding longitudinal reinforcement bars 20 and transverse reinforcement bars 21.

The longitudinal reinforcement bars 20 consist of eight mild steel bars having a diameter of $\phi=10$ mm. The transverse reinforcement 21 is formed of mild steel bars having a diameter of $\phi=8$ mm. and distributed along the length of the girder B at the spacing of five per meter.

The upper flange 12 has a width of 50 cm. and a height of 15 cm.

Figure 3:
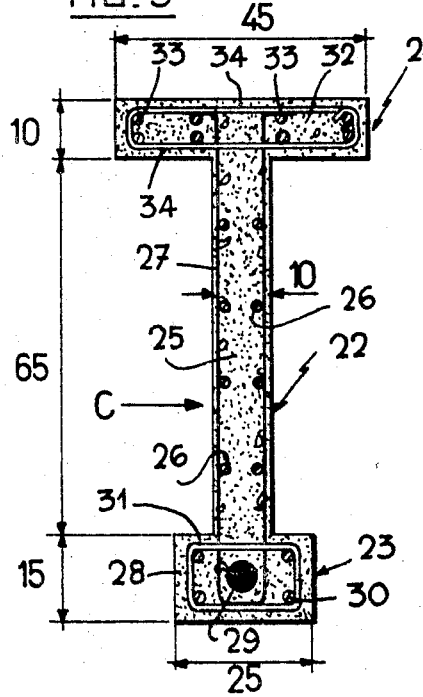
FIG. 3 is a cross-section of a conventional girder C of pre-stressed concrete having a thin web.

FIG. 3 shows a conventional girder C of prestressed concrete having the shape of a straight I and comprising a web 22, a lower flange 23 and an upper flange 24.

The web 22 of the girder C comprises a concrete body 25 reinforced by longitudinal reinforcement bars 26 and transverse reinforcement formed by stirrups 27. The reinforcement bars 26 have a diameter of $\phi=8$ mm. and are of mild steel. The transverse vertical stirrups 27 are of mild steel and uniformly distributed along the length of the web 22, at a spacing of five per meter.

The web 22 of the girder C has a width of 10 cm. and a height of 65 cm. Said web is of the "thick" type.

The lower flange 23 of the girder C comprises a concrete body 28 surrounding longitudinal prestressing wires 29, non calculated technological bars 30 and transverse reinforcement bars 31. The pre-stressing wires 29 have a total section of 7.8 cm.$^2$. The technological bars 30 are mild steel bars having a diameter $\phi=8$ mm. The transverse reinforcement bars 31 are mild steel bars having a diameter $\phi=8$ mm. These transverse reinforcement bars 31 are pendicular to the longitudinal direction of the lower flange 23 and uniformly distributed along the length of the latter, at a spacing of five per meter.

The lower flange 23 of the girder C has a width of 25 cm. and a height of 15 cm.

The upper flange 24 of the girder C also comprises a concrete body 32 reinforced by longitudinal technological bars 33 and transverse reinforcement bars 34.

The upper flange 24 of the girder C has a width of 45 cm. and a height of 10 cm.

Figure 4:
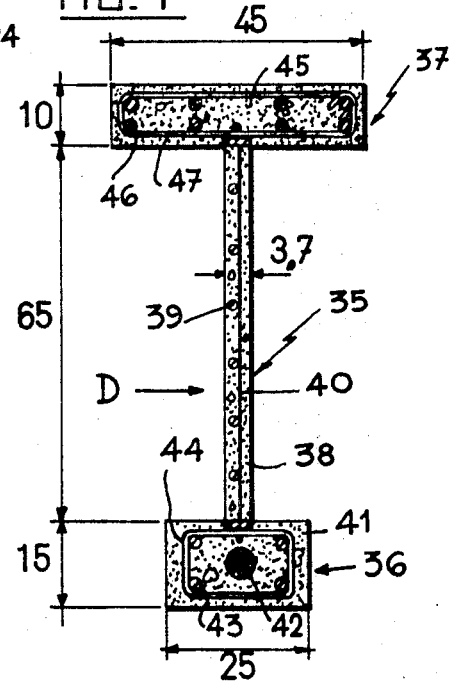
FIG. 4 is a cross-section of a girder D of pre-stressed concrete with a thin web, having the same effective span and resisting the same applied loads as the preceding girder C.

FIG. 4 shows a new I-shaped girder D equivalent to girder C in respect to the effective span and to the applied loads. Said girder D comprises a web 35, a lower flange 36 and an upper flange 37.

The web 35 of the girder D comprises a concrete body 38, longitudinal reinforcement bars 39 and transverse prestressing wires 40. The reinforcement bars 39 are of mild steel and have a diameter of $\phi=6$ mm. The pre-stressing wires 40 are of high tensile steel and have a diameter of $\phi=6$ mm. Said pre-stressing wires 40 are uniformly distributed along the length of the web 35 at a spacing of one wire per 6.5 cm.

The web 35 of the girder D has a width of 3.7 cm. and a height of 65 cm. It is of the "thin" type.

The lower flange 36 of the girder D is formed of a concrete body 41 surrounding longitudinal pre-stressing wires 42, longitudinal technological bars 43 and transverse reinforcement bars 44. The pre-stressing wires 42 are made of high tensile steel and have a total section of 7.8 cm.$^2$. The longitudinal reinforcement bars 43 are of mild steel and have a diameter of $\phi=8$ mm. The transverse reinforcement bars 44 are also of mild steel having a diameter of $\phi=8$ mm. and uniformly distributed along the length of the girder at a spacing of five per meter.

The lower flange 36 and the upper flange 37 of the girder D have the same dimensions as the lower flange 23 and the upper flange 24 of the girder C.

The upper flange 37 of the girder D has a concrete body 45, longitudinal reinforcement bars 46 and transverse reinforcement bars 47 identical to the elements of the upper flange 24 of girder C.

The pre-stressing wires 40 of the thin web are stressed in tension at 120 kg./cm.$^2$ and give on the concrete a compressive stress after loss, of 105 kg./cm.$^2$. Said compression allows the concrete to take over the effects of tension due to T.

As for the girder B, the percentage of the concrete volume of the flange to the volume of the reinforcement relating to the bending moment is practically the same in the girder C having a thick web as in the girder D having a thin web and of the same order of value as the percentage of the concrete volume of the thin web to the volume of the reinforcement bars of said thin web supporting the effect of the shearing force, this same percentage being definitely lower than that of the concrete volume of the web to the volume of the shear reinforcement bars in a girder with a thick web.

A girder having a thin web of reinforced concrete or pre-stressed concrete is made by a new method described hereinafter in details in connection with the girder B.

Figure 5:
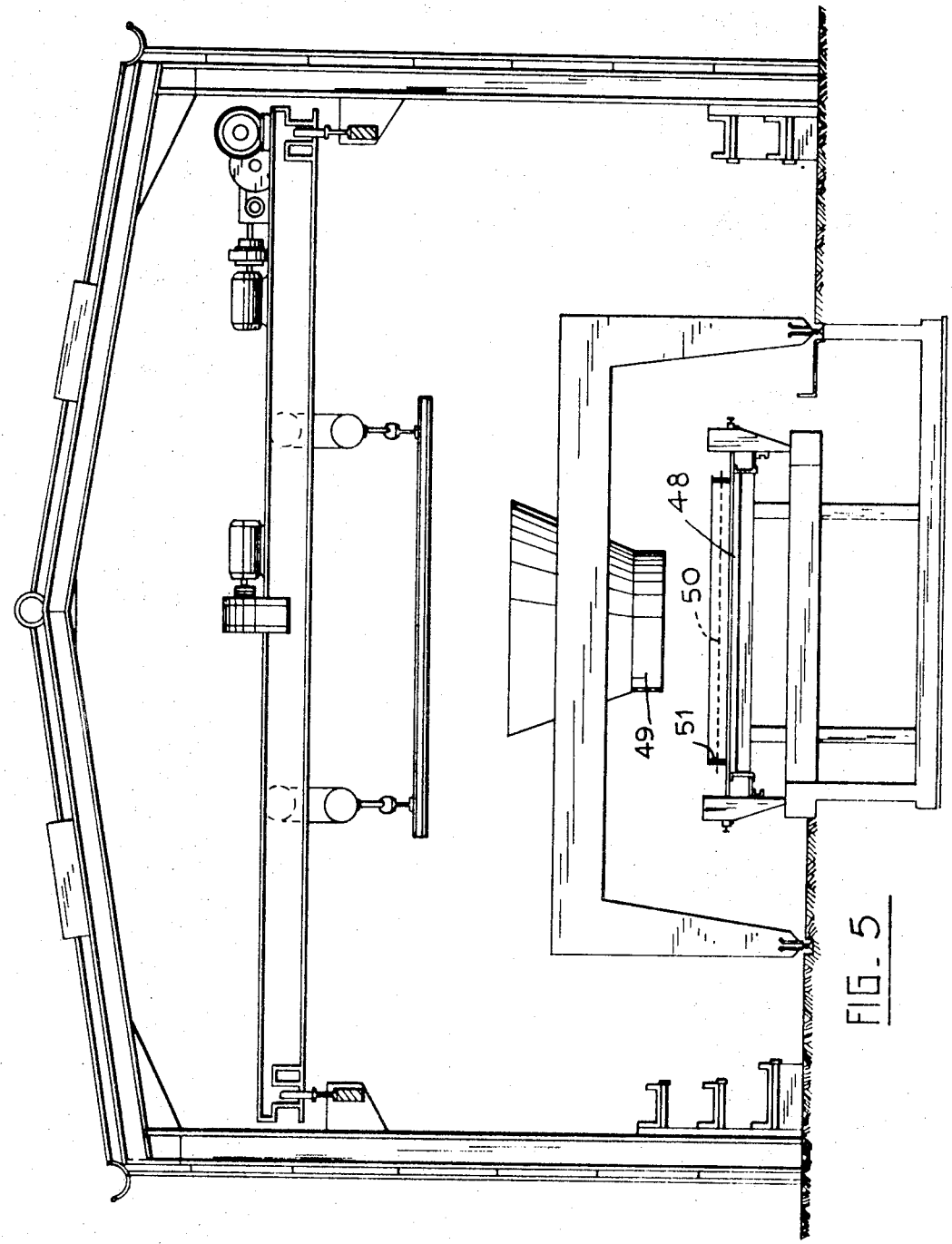
FIG. 5 is an elevation of a plant for making thin webs of girders according to the invention.
Figure 6:
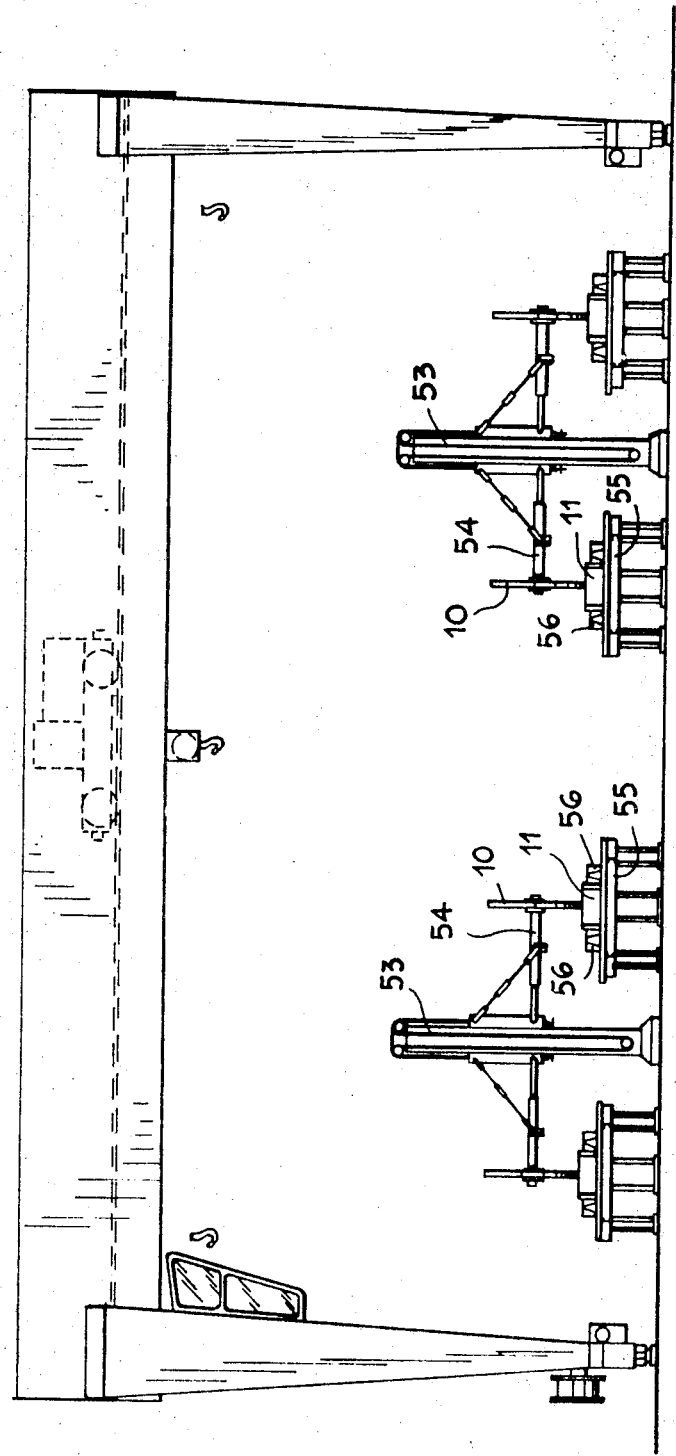
FIG. 6 is an elevation of a plant for making flanges of girders according to the invention.
Figure 7:
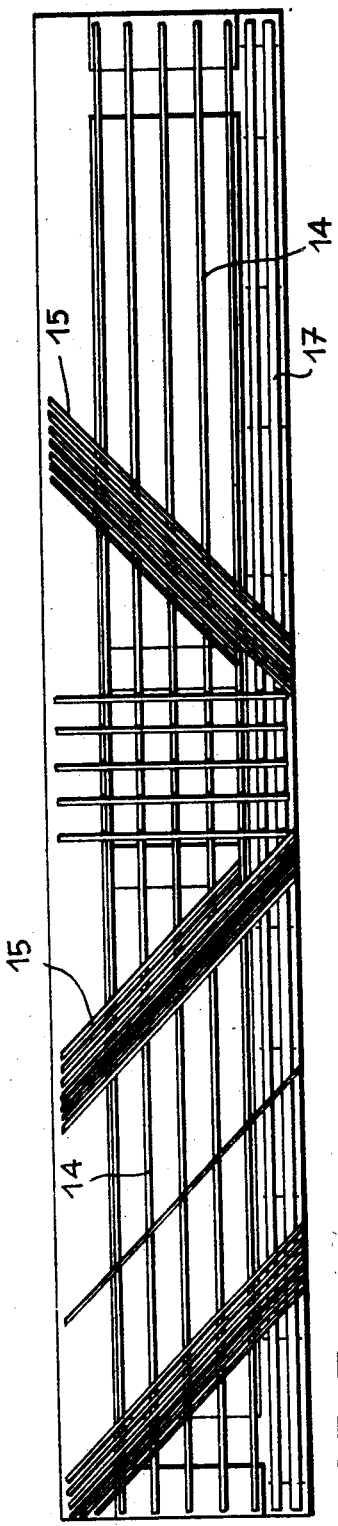
FIG. 7 is a view showing the arrangement of the reinforcement bars of the thin web of the girder B.
Figure 8:
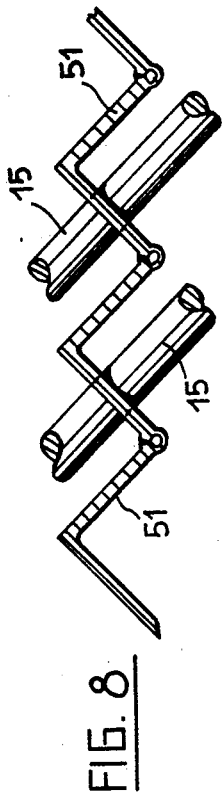
FIG. 8 is a horizontal section of a part of a specific side form of the casting mould for this thin web.
Figure 9:
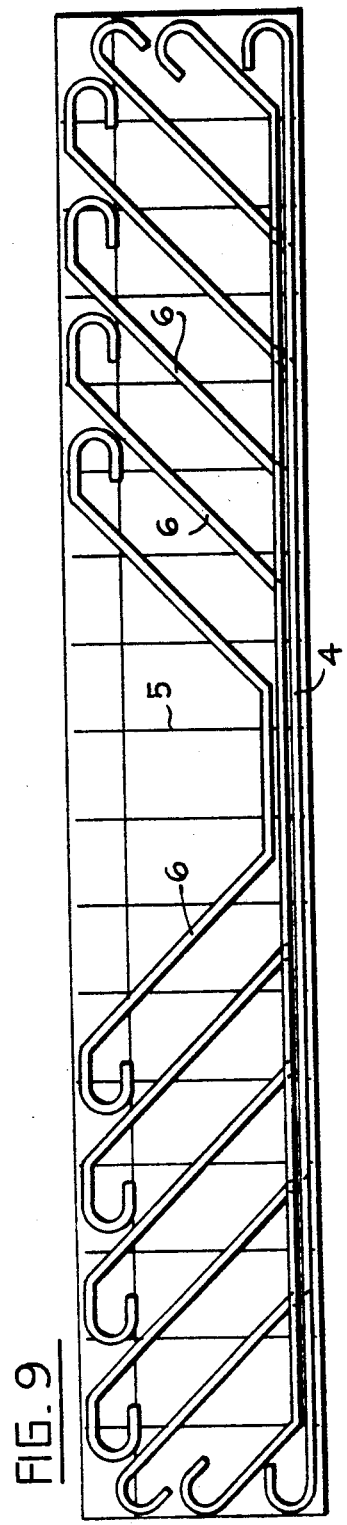
FIG. 9 is a view showing the arrangement of the reinforcement bars of the thick web of the girder A.

The manufacture method in fact comprises two successive distinct steps:

a first step wherein the thin web 10 is made independently of the flanges 11 and 12, using the plant shown in FIG. 5, a subsequent second step wherein the girder B is made entirely from the pre-fabricated and hardened thin web 10, using the plant shown in FIG. 6.

In the first step and in the first plant, the thin web 10 is made flat on a horizontal working table 48 located under a machine 49 for casting, distributing, vibrating and levelling the concrete. For this purpose, a lattice 50 of reinforcement bars 15 and 14 is mounted flat on the working table 48.

After having made the lattice 50 of reinforcement bars 14 and 15, side forms 51 of the horizontal mould for the web are placed on the working table 48. For the selected girder, these side forms, both longitudinal and transverse, are shaped in the form of saw-teeth and allow furthermore the transverse reinforcement bars 15 to project out of the mould. These bas 15 have also for an object to secure the flanges to the web. In addition such a saw-teeth profile provides for the transfer of the horizontal shear force at the level of the junction between the web and the flanges.

After having made on the working table 48 the horizontal mould containing the lattice 50, concrete is poured into said mould from the machine 49 and is distributed, vibrated and levelled thereby.

After having been poured, this concrete is heated for example by means of steam in order to accelerate its setting and its hardening that happens then in a few hours.

After setting of the concrete, the cast web 10 is demoulded and transferred to the second plant that is, in fact, used for casting the flange 11 and 12. This second plant essentially comprises jibs 53 provided with supporting arms 54 above horizontal working tables 55.

In the second step of the method, the lower flange 11 is first made. For this purpose, the web 10 is mounted vertically on the arms 54 of jibs 53 above the working table 55 and at determined distance therefrom. Thereafter, the longitudinal reinforcement bars 17 of said lower flange 11 are disposed and assembled by means of the transverse reinforcement bars 18 and connected with the free transverse reinforcement bars 15 of the web 10 projecting out thereof. Then, the side forms of the horizontal mould 56 are placed on both sides of these reinforcement bars to cast the flange 11. Thereafter, concrete is poured into the latter mould formed by 55 and 56, vibrated and heated in order to accelerate its setting.

After hardening of the concrete of lower flange 11, the latter is demoulded. Thereafter, the web 10 is removed from the arms 54 of jibs 53, the assembly of the web 10 and the lower flange 11 is inverted, the web 10 is fixed again to the arms 54 of jibs 53 and one proceeds with the manufacture of the upper flange 12 on the said working table 55 as for the lower flange 11.

The manufacturing of the girder D with a web of prestressed concrete is the same as for the girder B with a web of reinforced concrete. The casting of the flange is made in a mould, the longitudinal side forms of which connected to the prestressing wires are stressed in tension before or after pouring the concrete, said side forms remaining integral with the web.

FIG. 10 shows a particular embodiment of a web length of reinforced concrete.

In this case the transverse reinforecement bars 15 of the web length are fixed to two metal borders 57 placed along the longitudinal edges of the web length. The longitudinal metal borders 57 are fixed by welding to the reinforcement bars and form the longitudinal side walls 51 of the horizontal mould into which the concrete body 13 of web length is cast. Furthermore, similar metal borders are placed along the transverse edges of the web length and fixed to the reinforcement bars. Said transvers metal borders also serve as side forms of the same mould and allow moreover the mutual securing of successive web lengths placed end to end so as to form the whole completed web.

The thin web of the new girder may be fixed in different ways to the flange or flanges of said girder, which flanges may in addition be made of metal or of reinforced or pre-stressed concrete.

FIG. 12 shows a new girder whose thin web is made according to FIGS. 10 and 11 and whose upper and lower flanges respectively comprise two identical metal plates 58 welded to the borders 57.

FIG. 13 shows a part of another girder. The reinforced concrete web 10 of the latter is provided, after the manufacture and hardening, along one of longitudinal edges, with two metal angles 59 permanently mounted on both sides of said edge. These angles 59 remain attached to the web during the manufacturing of the corresponding flange, are embedded in the concrete of the latter and form longitudinal reinforcing elements of the latter. In this example, said angles 59 are embedded in a reinforced concrete flange; still they may be embedded in a pre-stressed concrete flange.

FIG. 14 shows another new girder with a thin web of reinforced concrete. The particular feature of said girder consists in its upper flange formed of a reinforced concrete slab 60. The concrete of the slab 60 is cast flat onto a provisional formwork made of a trellis-work 61 supported by two angles 62 movably mounted along the longitudinal upper edge of the web and on both sides of said edge. Said two angles also act as strengthening elements during transport of the girder form casting factory to site.

When the new girder is particularly long, it is made of a plurality of successive web lengths which are made separately as for a whole web. In this case, the longitudinal and transverse reinforcement bars of each web length are projecting laterally out of the concrete so as to obtain splicing bars. Thereafter, two adjoining web lengths are connected to one another. To this end, said adjoining web lengths are placed in alignment with one another and at a small distance from one another. In the present case, a suitable little mould is placed at their ends in which the corresponding splicing bars extend. Thereafter a concrete connecting body is cast in said little mould to form a reinforced concrete continuity.

After having successively fixed the web lengths to one another to form a whole web, the flanges of the girder are manufactured. Advantageously, the thickness of each web length is designed according to the shearing force to which it will be subjected under working loads, said shearing force being variable along the length of the girder.

The new method of making the thin web of the new girder makes it easy to manufacture an open web. For this purpose blocks or little internal forms should merely be provided in the horizontal casting mould for said web at the places of the openings of said web.

It should be understood that the present invention is not exclusively limited to the shown embodiments and that many modifications may be made in the form, the arrangement and the structure of some of the elements which take part in the embodiment thereof, provided that these modifications be not contradictory to the following claims.

What I claim is:

1. A method for manufacturing a flexural member having a thin shear-reinforced concrete web and at least one flange, comprising prefabricating the thin web independently of the flange in a horizontal flat mold having a width in excess of 50 cm. and a maximum height of 5 cm. plus 2.5% of its width, by placing in said mold shear reinforcement and then pouring concrete into the mold, the ratio of the cross-sectional area of the web to the cross-sectional area of the shear reinforcement being not more than 125 in the case of prestressed concrete and 35 in the case of other reinforced concrete, hardening the thin web, turning the hardened web upright, and thereafter casting onto the hardened thin web said at least one flange of the flexural member.

2. A method as claimed in claim 1, and disposing in said mold inserts of the same height as the mold so as to form openings in the web.

3. A method as claimed in claim 1, and fixing said shear reinforcement to at least one continuous metal border used as a side form of the horizontal flattened mold, and thereafter casting onto said border said at least one flange.

4. A method as claimed in claim 1, and casting onto the other longitudinal edge of said hardened thin web a flange of the flexural member.

5. A method as claimed in claim 1, in which said mold is of rectangular cross section and in which the concrete hardens with a flat upper surface in the mold.

References Cited

UNITED STATES PATENTS

| | | | |
|---|---|---|---|
| 1,572,669 | 2/1926 | Muller | 52—723 |
| 1,764,134 | 6/1930 | Young | 52—723 |
| 2,394,227 | 2/1946 | Barber | 264—228 |
| 2,435,998 | 2/1948 | Cueni | 52—334 |
| 3,152,421 | 10/1964 | Middendorf | 52—126 |
| 3,455,074 | 7/1969 | Rice | 52—223 |

FOREIGN PATENTS

| | | | |
|---|---|---|---|
| 595,894 | 4/1960 | Canada | 52—600 |
| 696,097 | 8/1953 | Great Britain | 52—223 |
| 854,448 | 11/1960 | Great Britain | 52—228 |
| 72,844 | 6/1953 | Netherlands | 52—223 |

OTHER REFERENCES

Roads and Streets, February 1954, pages 101–104, 117–118.

Clarence W. Dunham, Theory and Practice of Reinforced Concrete, McGraw-Hill Book Co., N.Y., Third edition, 1953, pages 392–414.

HENRY C. SUTHERLAND, Primary Examiner

J. L. RIDGILL, JR., Assistant Examiner

U.S. Cl. X.R.

52—723, 741